United States Patent [19]

Matsui et al.

[11] Patent Number: 4,665,831
[45] Date of Patent: May 19, 1987

[54] ELECTRIC POWER SUPPLYING SYSTEM FOR A CONTINUOUS TRANSIT SYSTEM BY MAGNET (CTM)

[75] Inventors: Kazumi Matsui, Yokohama; Minoru Otobe, Kawasaki; Takashi Takasue, Kawaguchi; Masami Iwasaki, Tokyo; Masaki Oda, Yokohama, all of Japan

[73] Assignee: The Furukawa Electric Co., Ltd., Tokyo, Japan

[21] Appl. No.: 708,436

[22] Filed: Mar. 5, 1985

[30] Foreign Application Priority Data

Mar. 9, 1984 [JP] Japan .................................. 59-43987
Mar. 22, 1984 [JP] Japan .................................. 59-53414

[51] Int. Cl.$^4$ ............................................ B60B 13/12
[52] U.S. Cl. ............................... 104/165; 104/298; 246/28 R; 246/35; 246/122 R
[58] Field of Search ............... 104/165, 168, 249, 295, 104/297, 298, 299, 301, 287, 288; 246/20, 22, 24, 26, 31, 35, 51, 187 R, 27, 28 R, 28 F, 34 R, 34 CT, 122 R; 318/587

[56] References Cited

U.S. PATENT DOCUMENTS

| | | | |
|---|---|---|---|
| 1,091,133 | 3/1914 | Hawkins | 246/35 |
| 1,596,221 | 8/1926 | Whitney | 246/26 |
| 3,450,874 | 6/1969 | Whitten | 246/122 R |
| 3,757,700 | 9/1973 | Nakagawa et al. | 104/165 |
| 3,821,544 | 6/1974 | Matty | 246/122 R |
| 4,197,934 | 4/1980 | Matsui et al. | 198/472 |
| 4,202,273 | 5/1980 | Matsui et al. | 104/298 |
| 4,278,164 | 7/1981 | Matsui et al. | 198/334 |
| 4,289,227 | 9/1981 | Matsui et al. | 198/334 |
| 4,348,618 | 9/1982 | Nakamura et al. | 104/295 |

Primary Examiner—Randolph A. Reese
Attorney, Agent, or Firm—Fleit, Jacobson, Cohn & Price

[57] ABSTRACT

An electric power supplying system for a continuous transit system by magnet (CTM) in which magnets attached to under parts of a certain number of cars comprising the trains and energized regularly are attracted to magnetic belts of a plurality of magnetic belt conveyor units arranged at predetermined intervals along a running track thereby successively drawing and running the trains. There is provided a trolley wire which is divided at least into a certain number of insulated sections at intervals of a predetermined block section length and a predetermined no-load current is supplied to the insulated sections of the trolley wire. When the current flowing to each insulated section of the trolley wire is within a predetermined range, the magnetic belt conveyor unit group corresponding to a block section following the insulated section with respect to the direction of train movement is operated.

7 Claims, 13 Drawing Figures

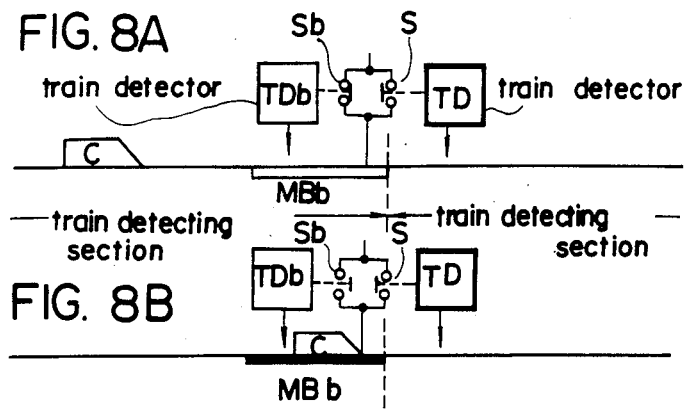
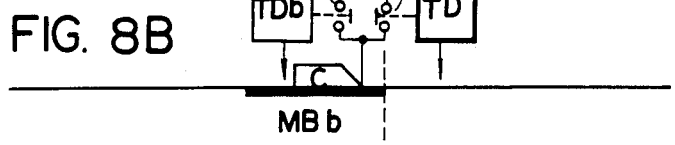
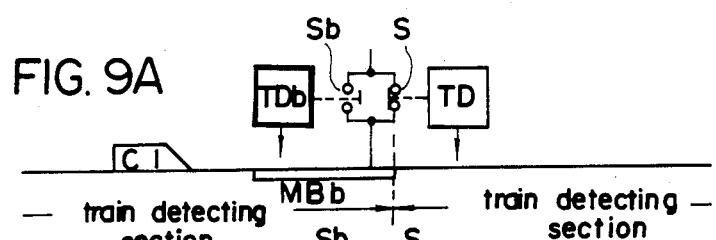
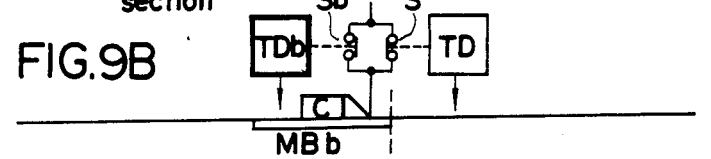
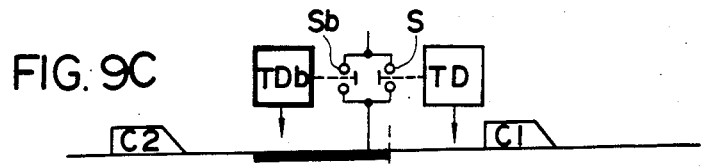
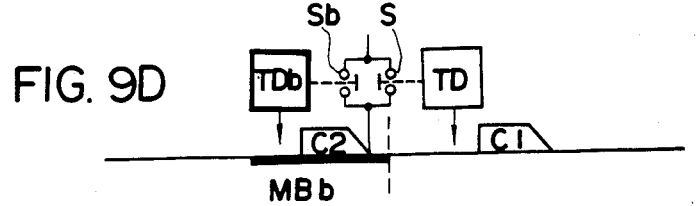

ELECTRIC POWER SUPPLYING SYSTEM FOR A CONTINUOUS TRANSIT SYSTEM BY MAGNET (CTM)

BACKGROUND OF THE INVENTION

The present invention relates to a power supply system for the continuous transit system by manet (hereinafter referred to as a CTM) in which the magnets are disposed on the lower part of a certain number of cars, the cars comprising a train, and energized regularly to be adhered to magnetic belts of a plurality of magnetic belt conveyor units arranged at certain intervals along a running track where the trains are successively drawn and run over.

U.S. Pat. Nos. 4,197,934, 4,289,227 and 4,278,164 concerning the CTM system and assigned to the same assignee constitute the background of the present invention.

In this type of conventional power supply system for the CTM, there are provided a certain number of block sections for a following train to prevent collisions with a preceding train. Furthermore the power is supplied in the following manner. A trolley wire for supplying power to the trains is divided into a definite number of insulated sections of a length corresponding to a predetermined block section and the current flowing into each insulated section of the trolley wire is detected. When the detected current exceeds a predetermined load current Io, that is defined for a train to be in the corresponding insulated section, and even if the train is not being moved, the magnetic belt conveyor unit group, set in the block section which corresponds to the insulated section immediately following the train occupied insulated section, is braked to stop a train defined to be in this following section. Thus, when the following train enters into this section, due to the magnetic belt conveyor unit group of the section being at rest, the following train is stopped and collision is prevented with the preceding train.

Since the conventional, power supply system provides a block section as described above, if, for example, any one of the branch lines interconnecting the insulated sections and the feeder line becomes faulty, no current flows to the faulty branch line with the result that even if a train is present in the faulty section no current flows to the corresponding section of the trolley wire. This invites the same result as obtained when there is no train and therefore the associated magnetic belt conveyor unit group is caused to operate continuously. In this condition, if the following train enters this section, there is the danger of it colliding with the preceding train from behind. The same result occurs when the power supply from the supply circuits is interrupted, for example.

The disadvantages of the conventional CTM power supply system such as failures of the current supply circuits are not compensated for sufficiently by safe compositions.

SUMMARY OF THE INVENTION

It is an object of the present invention to provide a power supply system for CTM which is so designed that when establishing a block section, the occurrence of any failure such as a service stop, or failures of any supply circuit, or failures of any detecting unit itself, cause its control system to function on the safe side.

It is another object of the invention to provide a power supply system so designed that when establishing a block section, the repetitious making and breaking operation is decreased.

In accordance with one form of the invention, there is thus provided a power supply system comprising a trolley wire divided into insulated sections, at certain intervals, or block section lengths, and adapted to supply power to trains, and a plurality of resistors adapted to be connected to the returning trolley wire through the resistors and adapted to regularly carry a no-load current between the insulated sections of the trolley wire and the above described returning trolley wire. The current supplied to each insulated section of the trolley wire is detected so that when the current is within a predetermined range, a specified operation occurs at the magnetic belt conveyor unit group corresponding to the block section immediately following the sensed insulated section with respect to the direction of train movement.

In accordance with another form of the invention, there is provided a power supply system comprising a feeder line, a first trolley wire divided into a plurality of insulated sections at intervals of a predetermined block section length, a branch line to connect each thereof to the feeder line and a second trolley wire arranged parallel to the first trolley wire and forming a current return feeder. The system further includes plural resistors connected between the insulated sections of the first trolley wire and the second trolley wire, and a first train detector provided for each of the branch lines so as to detect the current supplied thereto such that a control signal is generated when the current is within a predetermined range. Thus, the magnetic belt conveyor unit group, corresponding to the immediately following insulated section of the first trolley wire with respect to the direction of movement of the trains, is operated in response to the control signal from the first train detector and it is stopped in other circumstances.

Thus, in accordance with the CTM power supply system of the invention, a no-load current is supplied to the first trolley wire so that the corresponding magnetic belt conveyor unit group is operated when the current supplied to the first trolley wire is equal to the no-load current or in a range of values closed thereto (io±Δio), while the group is stopped when the current is out of the said range thereby always establishing a block section in any case of the above-mentioned failures and making the power supply system fail safe.

In accordance with still another form of the invention, there is provided a CTM power supply system so designed that a first trolley wire is divided into insulated sections at intervals of a predetermined train detecting section length and each insulated section is divided into a first subsection and a second subsection corresponding to a braking section length. Each first subsection is connected to the feeder line through a branch line and the first and second subsections of each section are electrically connected. A resistor is connected between each second subsection of the first trolley wire and the second trolley wire. The second train detectors are provided in addition to the first train detectors. Each of the second train detectors detects the current flowing between the first and the second subsections in each insulated section of the first trolley wire and generates a control signal when the current is within a predetermined range. On the other hand, magnetic belt conveyor unit groups corresponding to the first subsections of the first trolley wire and magnetic belt conveyor unit groups corresponding to the second subsections are arranged succesively at a certain interval on the track side. The first magnetic belt conveyor unit groups are operated at all times and each second magnetic belt conveyor unit group is operated in response to the generation of a control signal from either the second train detector of the corresponding train detecting section or the first train detector of the just preceding train detecting section. Only when the following train enters the second subsection of the first trolley wire or the braking section of the train detecting section just follows the preceding train, the magnetic belt conveyor unit group corresponding to the second subsection is stopped to prevent the following train from the collision with the preceding one.

Thus, with the CTM power supply system according to another form of the invention, by virtue of the fact that the resistors are connected between the first and the second trolley wires and that the first trolley-wire section for each train detecting section is divided into two parts, in the normal condition the magnetic belt conveyor unit group is stopped only when the distance between the preceding train and the following train is shorter than a predetermined distance thereby decreasing the repetitions of operations to start and stop. Also, due to the fact that the presence of a train, failure or the like is detected in accordance with the no-load current, the fail-safe power supply system is realized which is capable of always establishing the desired block section in any case of these failures. Also, by virtue of the fact that the following train is allowable to approach the preceding train within a predetermined distance or one corresponding to the braking section length, a high-density train operation is ensured for the trains running at low speeds, particularly in the vicinity of a station, for example.

Other objects and advantages of the invention will be apparent from the following description, the appending claims and accompanying drawings.

BRIEF DESCRIPTION OF THE DRAWINGS

FIGS. 8A and 8B and FIGS. 9A to 9D are diagrams for explaining the operation of the system in faulty conditions.

DESCRIPTION OF THE PREFERRED EMBODIMENTS

Figure 1:
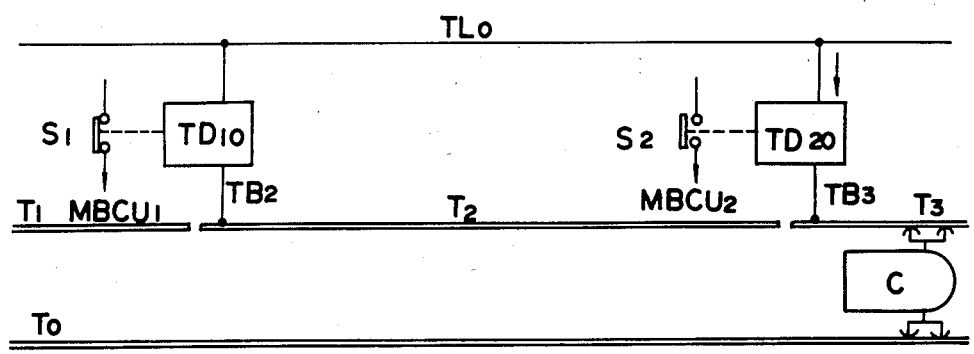
FIG. 1 is a schematic diagram of a conventional CTM power supply system constituting the background of the present invention.

Before describing preferred embodiments of the invention, a conventional CTM power supply system will now be described with reference to FIG. 1, from a view to facilitate the understanding of the invention. In the Figure, symbol TLo designates a feeder line, TB2 and TB3 branch lines, and To, T1, T2 and T3 rigid trolley wires with T1, T2 and T3 being high side ones and To a low side one. Symbols TD10 and TD20 designate train detectors, and S1 and S2 switches for the train detectors TD10 and TD20, respectively. Designated at C is a train having electromagnets (not shown) attached at least to its lower part and the electromagnets are supplied with power and energized through the trolley wires T1, T2, T3 and To. On the other hand, provided on the ground side are magnetic belt conveyor units which are arranged successively at predetermined intervals and formed into groups (MBCU1, MABCU2) in correspondence to the length of the trolley wires T1, T2 and T3 or the block length. Thus, the start and stop of these units are controlled group by group.

Assuming now that the train C is at the position of the trolley wire T3, a load current Io flows to the train C through the branch line TB3 so that the current Io is detected by the train detector TD20 and the switch S2 in the closed position is opened. When the switch S2 is opened, the magnetic belt conveyor unit group MBCU2 corresponding to the trolley wire T2 and in operation is braked and stopped. As a result, even if the following train enters the section of the trolley wire T2, the magnetic belt conveyor unit group MBCU2 is not in operation so that the entering train is stopped and prevented from colliding with the preceding train.

This conventional CTM power supply system has the previously mentioned disadvantages.

The present invention will now be described in greater detail with reference to the illustrated embodiments.

Figure 2:
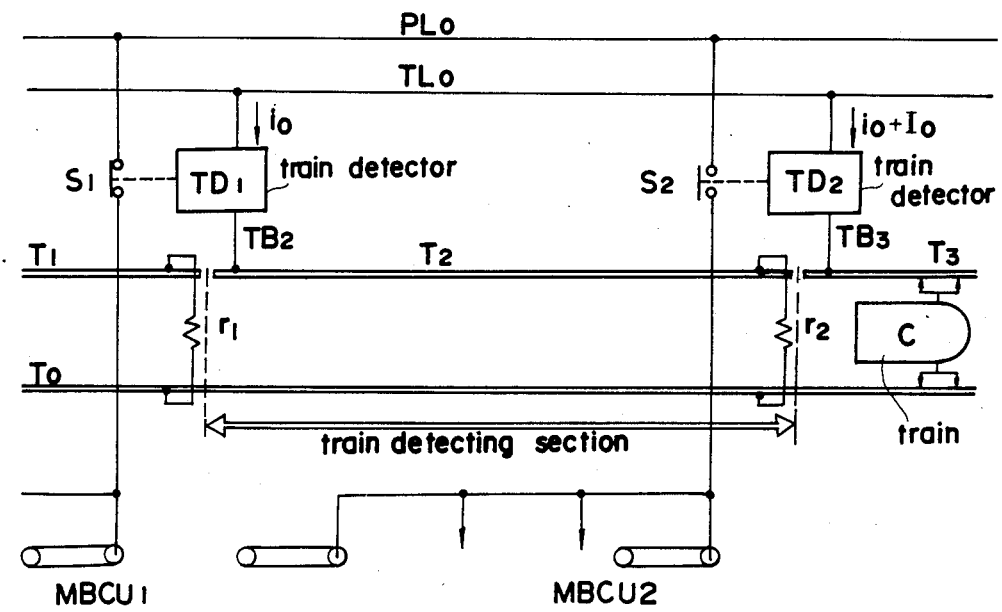
FIG. 2 is a schematic diagram of a CTM power supply system according to an embodiment of the invention.

FIG. 2 is a schematic diagram showing a CTM power supply system according to one embodiment of the invention. As compared with the conventional power supply system shown in FIG. 1, the embodiment features resistors r1 and r2 respectively connected between first trolley wires t1 and t2 and a second trolley wire To and that train detectors TD1 and TD2 and their switches S1 and S2 differ in function from their counterparts in the conventional system.

The electric power supplied to a feeder line TLo is supplied to the first trolley wire through branch lines TB2 and TB3. The first trolley wire is divided into insulated sections in correspondence to a block section length, that is, it is divided into the trolley wires T1, T2 and T3 as shown in the Figure. The second trolley wire To is not divided into any insulated sections and it is arranged parallel to the first trolley wires T1, T2 and T3 to form a current return feeder. This feeder may for example be provided by using rails made of electrically conductive material. Electromagnets and other equipment are mounted on the train C and the current is collected from the trolley wires T1, T2, T3 and To thereby supplying the power to the electromagnets, etc.

On the other hand, provided on the ground side are magnetic belt conveyor units of a known type which are arranged continuously at predetermined intervals and formed into groups (MBCU$_1$, MBCU$_2$) in correspondence to the insulated trolley wire sections of the first trolley wire or the block sections. Then, the magnetic belt conveyor unit groups MBCU$_1$ and MBCU$_2$ are respectively connected through the switches S1 and S2 to a distribution line PLo and the start and stop of the magnetic belt conveyor unit groups are controlled group by group.

When this type of magnetic belt conveyor unit group comes into operation, the magnetic belts circulate so that the electromagnets of the train and the magnetic belts are attracted to each other and the train is drawn and run by the motion of the magnetic belts.

While the above-described construction is the same with the conventional system, in the present embodiment the resistors r1 and r2 are connected between the insulated trolley wire sections T1, T2 and T3 of the first trolley wire and the second trolley wire (the resistor corresponding to the trolley wire T3 is not shown). Thus, the current flows, for example, through the path including TB2, T2 and r2 so that even in the absence of any train, the no-load current io corresponding to the resistor flows through the branch lines TB2 and TB3, respectively.

Figure 3:
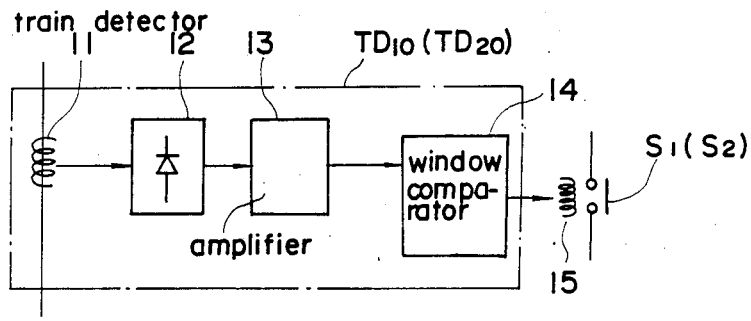
FIG. 3 is a block diagram of a train detector.
Figure 4:
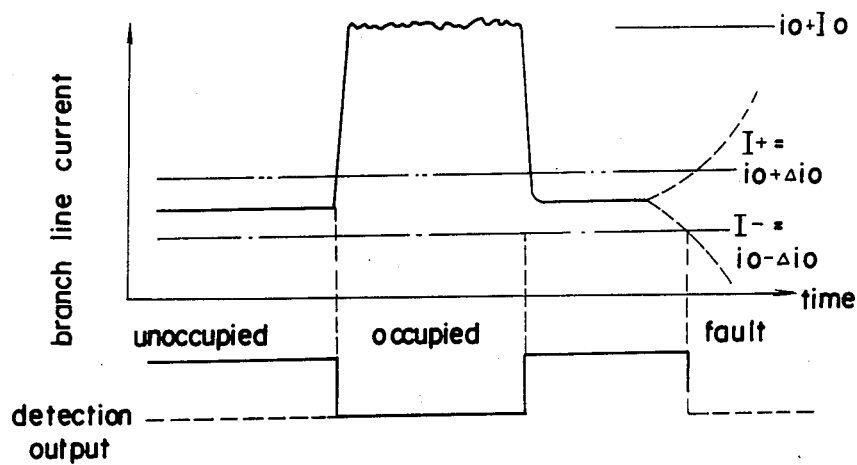
FIG. 4 is characteristic diagram of the train detector.

On the other hand, as shown in FIG. 3, each of the train detectors TD1 and TD2 connected to the branch lines includes a current transformer 11, a full-wave rectifier 12, an amplifier 13 and a window comparator 14 and it is adapted to function as shown in FIG. 4. Said window comparator 14 generates an output only when an input signal transmitted thereinto is within a predetermined range. In other words, only when a branch current is within a predetemined range, (e.x.I-<i<I+), the detector generates an output and this output energizes an excitation coil 15 of the switch S1 (or S2). Each of the train detectors TD1 and TD2 generates an output only when the branch current i becomes:

$$I-(=io-\Delta io)\leq i \leq I+(=io+\Delta io)$$

On the contrary, no output is generated under the following conditions $$I-(=io-\Delta io)>io \text{ or } I+(=io+\Delta io)<i$$

In the above equations, $\Delta io$ represents a current corresponding to the variation of the no-load current io.

Each of the switches S1 and S2 is composed for example of an electromagnetic contactor of the normally-open type and it is closed by the output of the associated train detector.

Thus, the operating modes of the train detectors may be summarized as shown in the following Table 1.

TABLE 1

| Condition | Switch Condition |
| --- | --- |
| $I- \leq i \leq I+$ | Closed |
| $i < I-$ (e.x. i = O) | Open |
| $i > I+$ (e.x. i = io + Io) | |
| Internal fault of train detector | Open |

The operation of the magnetic belt conveyor unit groups are controlled in response to the opening and closing of the switches S1 and S2, In other words, each magnetic belt conveyor unit group is operated by the closing of the switch and braked and stopped by the opening of the switch.

Next, the operation of the power supply system according to this embodiment in the normal and faulty conditions, respectively, will be described.

NORMAL CONDITION

When the train C is not in the train detecting section, the no-load current io is supplied to the branch line TB2 through the resistor r2 as shown in the section of the trolley wire T2. As a result, the switch S1 of the train detector TD1 is closed and the magnetic belt conveyor unitgroup MBCU₁ corresponding to the section of the trolley wire T1 is brought into operation.

On the other hand, if the train C is present in the train detecting section, that is, if the train C exists in the section of the trolley wire T3 as shown in the Figure, for example, the current in the branch line TB3 becomes (io+Io) due to the flow of the load current Io to the train C. Thus, the switch S2 of the train detector TD2 is opened and the magnetic belt conveyor unit group MBCU₂ corresponding to the section of the trolley wire T2 is stopped. As a result, even if the following train enters the section of the trolley wire T2, the train is stopped and prevented from colliding with the preceding train from behind.

FAULTY CONDITION

When there is no current flowing through the branch line, that is, when the branch line, the resistor or the line becomes faulty, for example, the switch is opened and the corresponding magnetic belt conveyor unit group is stopped. If the current flowing through the branch line is greater than the normal value (io+Io), that is, when the trolley wire is short-circuited, for example, the switch is opened and the corresponding magnetic belt conveyor unit group is stopped. Also, when the train detector becomes faulty, the switch is opened and there results the same condition as when the train is present.

It is to be noted that in this embodiment the magnitude of the no-load current io must be determined in relation with the magnitude of the train load current Io so as to improve the S/N ratio.

A CTM power supply system according to another embodiment of the invention will now be described.

Figure 5:
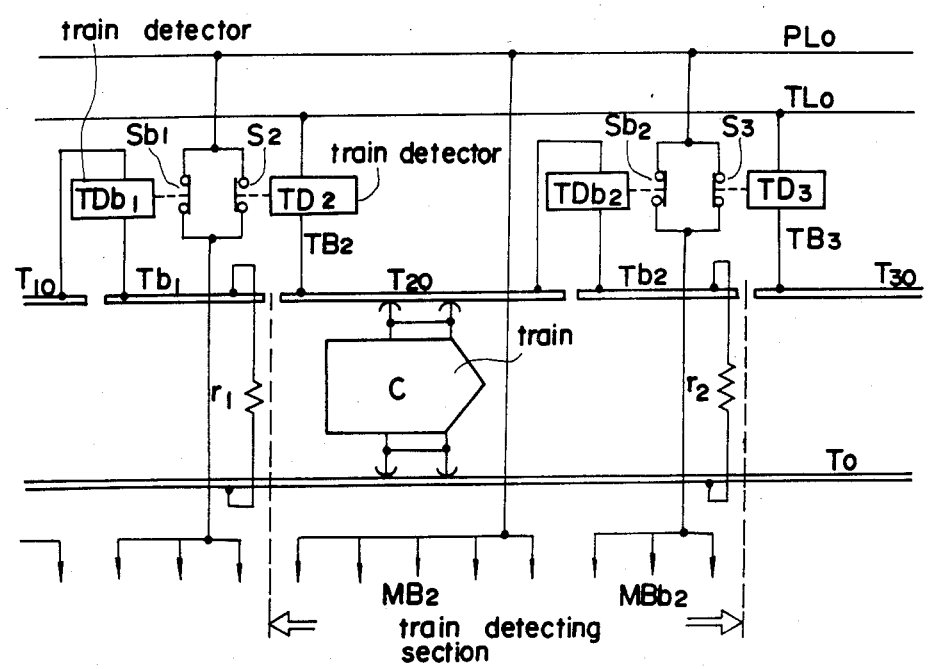
FIGS. 5 and 6 are a schematic diagram of a CTM power supply system according to another embodiment of the invention.
Figure 6:
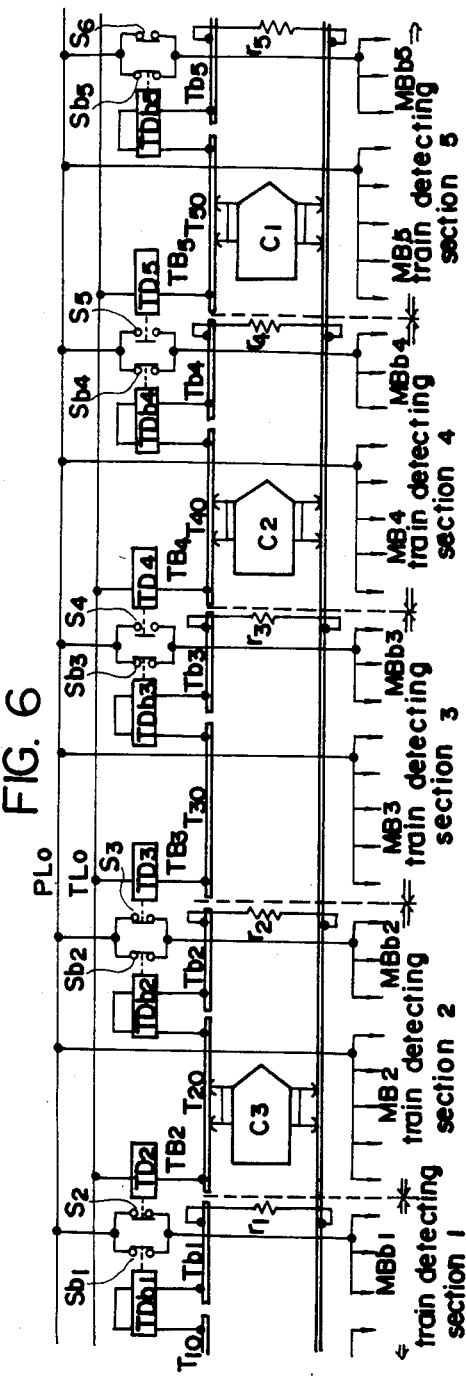

Referring to FIGS. 5 and 6, designated at T10, Tb1, T20, Tb2, T30, Tb3, T40, Tb4, T50 and Tb5 are trolley wires which as a whole form a first trolley wire according to the invention. The first trolley wire is divided into insulated sections (T10, Tb1//T20, Tb2//T30, Tb3//T40, Tb4//---) in correspondence to predetermined train detecting sections and each of the insulated sections is divided into a first insulated subsection and a second insulated subsection corresponding to a braking section length (T10//Tb1, T20//Tb2, T30//Tb3 ---). The trolley wires T10, T20 ---, T50 are respectively connected through branch lines TB2, -- -, Tb5 (the branch line of the trolley line T10 is not shown) to a feeder line TLo. Also, the trolley wires T10, T20, ---, T50 are respectively connected electrically to the trolley wires Tb1, Tb2, ---, Tb5 ---. Designated at To is a second trolley wire arranged parallel to the first trolley wire and forming a current return feeder. Designated at r1, r2, r3, r4 and r5 are resistors respectively connected between the trolley wires Tb1, Tb2, Tb3, Tb4 and Tb5 and the second trolley wire To. Designated at TDb1, TDb2, TDb3, -- -, TDb5 are train detectors for respectively detecting the current flowing between the trolley wires T10, T20, ---, T50 and the trolley wires Tb1, Tb2, Tb3, ---, Tb5, respectively, and generating a control signal when the current is within a predetermined range. Switches Sb1, Sb2, ---, Sb5 are respectively provided for the train detectors TDb1, TDb2, - --, TDb5. The switches Sb1, Sb2, ---, Sb5 are closed by the control signal from the train detectors TDb1, TDb2, ---, TDb5, respectively.

Designated at TD2, TD3, TD4 and TD5 are train detectors respectively connected in the branch lines TB2, TB3, TB4 and TB5. Switches S2, S3, S4 and S5 are respectively provided for the train detectors TD2, TD3, TD4 and TD5. The train detectors TDb1, TDb2, ---, TDb5 are operated on the same principle as the train detectors TD2, TD3, ---, TD5 and they are the same in construction with the embodiment shown in FIG. 2.

Designated at MBb1, MB2, MBb2, ---, MB5 are magnetic belt conveyor unit groups which are arranged along the track. Of these magnetic belt conveyor unit groups, the magnetic belt conveyor unit groups MB2, MB3, ---, MB5 are supplied with the power directly from a distribution line PLo and they are in operation at all times. On the other hand, the magnetic belt conveyor unit groups MBb1, MBb2, ---, MBb5 are supplied with the power through parallel circuits of the switches Sb1 and S2, Sb2 and S3, ---, Sb5 and S6, respectively, from the distribution line PLo so that when both of the two switches forming each parallel circuit are opened, the corresponding magnetic belt conveyor unit group is stopped. Designated at C1, C2 and C3 are trains each having at least electromagnets and supplied with the power through the first and second trolley wires so that the electromagnets are attracted and drawn by the magnetic belt conveyor unit groups of the track to run the trains.

Next, the operation of the power supply system according to the second embodiment will be described with reference to FIG. 7.

Figure 7:
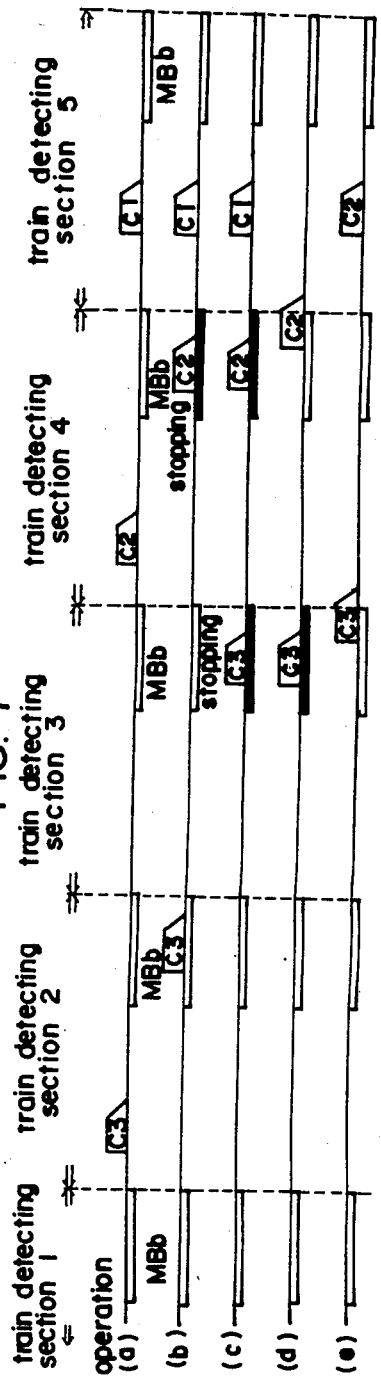
FIG. 7 is a diagram to explain details for the operation of the power supply system shown in FIGS. 5 and 6.

In the section where there is no train as in the case of the train detecting section 3 in FIG. 7(a), a no-load current io flows to the train detectors TD3 and TDb3 so that the switches S3 and Sb3 are closed and the braking-section magnetic belt conveyor unit groups MBb2 and MBb3 are brought into operation. Here, the magnetic belt conveyor unit groups MB2, MB3, ---, MB5 are not shown in FIG. 7 since they are in operation at all times and only the magnetic belt conveyor unit groups of the braking sections are shown. In the Figure, the white ones are in operation and the black ones are at rest.

If the train C2 is present in the train detecting section 4, the current (io+Io) flowing to the train detector TD4 is greater than io+$\Delta$io and thus the switch S4 is opened. However, no train is present in the breaking section of the following train detecting section so that the switch Sb3 of the train detector TDb3 remains in the closed condition and the magnetic belt conveyor unit group MBb3 of this braking section is in operation.

The above-mentioned operating conditions are the same in the case of the trains C1 and C3, respectively. In other words, all the magnetic belt conveyor unit groups are in opeation in the condition of FIG. 7(a).

Then, when the trains move forward as shown in FIG. 7(b) so that the train C2 enters the braking section of the train detecting section 4, the current flowing to the train detector TD4 and TDb4 is increased and the switches S4 and Sb4 are opened. At this time, the train C1 is present in the train detecting section 5 and the switch S5 of the train detector TD5 is opened. Since both of the switches Sb4 and S5 connected is parallel are opened in this way, the corresponding magnetic belt conveyor unit group MBb4 is stopped. Thus, the train C2 is also stopped.

In this way, when the following train enters the braking section of the train detecting section following the preceding train, the magnetic belt conveyor unit group of this braking section is brought to a stop and the following train is also stopped.

Then, as the train C3 enters the braking section of the train detecting section 3 as shown in FIG. 7(c), the current flowing to the train detectors TD3 and TDb3 is increased and the switches S3 and Sb3 opened. In this case, the train C2 is present in the train detecting section 4 and the switch S4 is open. Thus, both of the switches Sb3 and S4 are open so that the magnetic belt conveyor unit group MBb3 is stopped and the train C3 is also stopped.

When the train C1 enters the next train detecting section as shown in FIG. 7(d) so that no train is present in the train detecting section 5, the magnetic belt conveyor unit group MBb4 is brought into operation and the train C2 moves forward. Then, as the train C2 enters the train detecting section 5 as shown in FIG. 7(e) so that no train is present in the train detecting section 4, the magnetic belt conveyor unit group MBb3 is brought into operation and the train C3 is moved forward.

While the above-described operations take place when the control systems are all functioning normally, the operations which will take place in case of faults will now be described separately with respect to the control system of the train detectors TD(TD2, TD3, ---, TD5) and the control system of the train detectors TDb (TDb1, TDb2, ---), respectively.

It is to be noted that the faulty conditions include internal faults of the train detectors themselves, breaks in the branch lines, a short-circuit between the first and second trolley wires, breaks in the connecting lines between the first-subsection trolley wires (e.g., T10) and the second-subsection trolley wires (e.g., Tb1) of the first trolley wire and so on.

When the control system of the train detectors TD is faulty:

When the control system of the train detector TD is faulty, the switch S is opened as shown in FIGS. 8A and 8B. In these circumstances, if a train C enters the braking section just on the upstream side of the train detector TD, this is detected by the train detector TDb and its switch Sb is opened. Thus, both of the switches S and Sb are opened so that the corresponding belt conveyor unit group MBb is stopped and the train C is also stopped thereby effecting the blocking.

When the control system of the train detectors TDb is faulty:

When there is a fault in the control system of the train detector TDb, its switch Sb is opened as shown in FIGS. 9A to 9D. In these circumstances, even if the train C1 enters the braking section, the switch S is in the closed condition so that the magnetic belt conveyor unit group MBb is in operation and the train C1 is moved forward (FIGS. 9A and 9B). Then, as the train C1 enters the next train detecting section, this is detected by the train detector TD and its switch S is opened (FIG. 9C). As a result, both of the switches Sb and S are opened and the corresponding magnetic belt conveyor unit group MBb is stopped. Then, as the following train C2 enters the braking section, the train C2 is also stopped since the magnetic belt conveyor unit group MBb is out of operation.

It is to be noted that while the disconnection of the power supply in the train (due to the breaking of a fuse, for example) interrupts the flow of the load current thus producing the same effect as is the case when there is no train, such a situation can be met by providing for example an auxiliary resistor in the train such that upon breaking of the fuse the auxiliary resistor is connected and a suitable load current is supplied.

What is claimed is:

1. An electric power supplying system for a continuous transit system by magnet comprising:
 a first trolley wire divided at least into a certain number of insultated sections at intervals of a predetermined block section length and adapted to supply current to trains;

a second trolley wire arranged parallel to said first trolley wire and forming a return feeder for current;

a plurality of resistors, each being connected to a different section of said first trolley wire and second trolley wire such that each of said resistors carries a predetermined no-load current to one of said insulated sections of said first trolley wire, means for detecting the current supplied to each section of said first trolley wire and, when the detected current including said predetermined no-load current is within a predetermined range, providing an indication to operate one of a plurality of magnetic belt conveyor unit groups corresponding to a block section immediately following each said insulated section with respect to a direction of train movement.

2. An electric power supplying system for a continuous transit system by magnet comprising:

a feeder line;

a first trolley wire divided into a certain number of insulated sections at intervals of a predetermined block section length, each of said insulated sections being connected to said feeder line through a branch line;

a second trolley wire arranged parallel to said first trolley wire and forming a return feeder for current;

a plurality of resistors each of which is connected between a different one of said insulated sections of said first trolley wire and said second trolley wire and through which a predetermined no-load current flows in a normal state;

a plurality of train detectors each thereof being connected to one of said branch lines to detect a current supplied thereto and generate a control signal when said detected current including said predetermined no-load current is within a predetermined range, whereby in response to said control signal from each said train detector, one of a plurality of magnetic belt conveyor unit groups, corresponding to one of said insulated sections of said first trolley wire immediately following that associated with each said train detector with respect to a direction of train movement, is operated.

3. A system according to claim 2, wherein each said train detector comprises a current transformer for detecting the current supplied to said one branch line, and a window comparator.

4. A system according to claim 2, wherein each of said magnetic belt conveyor unit groups is connected to a distribution line through a switch adapted to be closed in accordance with a control signal from associated one of said train detectors.

5. An electric power supplying system for a continuous transit system by magnet comprising:

a feeder line;

a first trolley wire divided into a certain number of insulated sections at intervals of a predetermined train detecting section length each of said insulated sections being divided into a first insulated subsection and a second insulated subsection corresponding to a predetermined braking section length, said first subsection being connected to said feeder line through a branch line, said first and second subsections being electrically connected to each other;

a second trolley wire arranged parallel to said first trolley wire and forming a return feeder for current;

a plurality of resistors each thereof being connected between a different one of said second subsections of said first trolley wire and said second trolley wire;

a plurality of first train detectors each thereof being adapted to detect a current supplied to one of said branch lines and generate a control signal when said current is within a predetermined range;

a plurality of second train detectors each thereof being adapted to detect a current flowing between the first and second subsections in one of said insulated sections of said first trolley wire and generate a control signal when said current is within a predetermined range;

a plurality of first magnetic belt conveyor unit groups each thereof corresponding to one of said first subsections of said first trolley wire; and a plurality of second magnetic belt conveyor unit groups each thereof corresponding to one of said second subsections of said first trolley wire;

said first and second magnetic belt conveyor unit groups being alternatively arranged successively on a track side, said first magnetic belt conveyor unit groups being operated at all times, each of said second magnetic belt conveyor unit groups being operated in response to the application of a control signal from one or the other of said second train detector of corresponding one of said train detecting sections and said first train detector of immediately preceding one of said train detecting sections.

6. A system according to claim 5, wherein each of said first and second train detectors comprises a current transformer and a window comparator.

7. A system according to claim 5, wherein each of said second magnetic belt conveyor unit groups is connected to a distribution line through a parallel circuit of a first switch and a second switch, and wherein said first switch is closed in accordance with a control signal from associated one of said first train detectors and said second switch is closed in accordance with a control signal from associated one of said second train detectors.

* * * * *